US011835972B2

(12) United States Patent
Huang et al.

(10) Patent No.: US 11,835,972 B2
(45) Date of Patent: Dec. 5, 2023

(54) PRESSURE-REGULATING DEVICE

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Taichung (TW)

(73) Assignee: Grand Mate Co., Ltd., Taichung (TW)

( * ) Notice: Subject to any disclaimer, the term of this patent is extended or adjusted under 35 U.S.C. 154(b) by 101 days.

(21) Appl. No.: 17/495,466

(22) Filed: Oct. 6, 2021

(65) Prior Publication Data

US 2023/0104470 A1  Apr. 6, 2023

(51) Int. Cl.
*G05D 16/06* (2006.01)

(52) U.S. Cl.
CPC ............... *G05D 16/0638* (2013.01)

(58) Field of Classification Search
CPC .. G05D 16/0638; G05D 16/103; G05D 16/10; F16K 15/18; F16K 15/182; F16K 15/184
See application file for complete search history.

(56) References Cited

U.S. PATENT DOCUMENTS

| | | | | |
|---|---|---|---|---|
| 3,811,400 | A * | 5/1974 | Smilg | G01L 19/08 137/557 |
| 6,273,130 | B1 * | 8/2001 | Cossins | A62B 9/006 137/557 |
| 8,146,592 | B2 * | 4/2012 | Voege | A61M 16/207 128/207.14 |

(Continued)

FOREIGN PATENT DOCUMENTS

| | | |
|---|---|---|
| GB | 503137 A | 3/1939 |
| TW | M342484 U | 10/2008 |

(Continued)

OTHER PUBLICATIONS

Search Report for EP22183299.1, dated Dec. 23, 2022, Total of 9 pages.
Search Report for TW110130063, dated Sep. 23, 2022, Total of 1 page.
Translation of Abstract of TW202004088, Total of 1 page.
Translation of Abstract of TWM342484, Total of 1 page.
Translation of Abstract of TWM614177, Total of 1 page.

*Primary Examiner* — Jessica Cahill
(74) *Attorney, Agent, or Firm* — Apex Juris, pllc; Hilde Coeckx

(57) ABSTRACT

A pressure regulating device includes a pressure stabilizer including a valve body, a pressure regulating assembly, and a switching assembly. The valve body has an inlet portion, a decompression chamber communicating with the inlet portion, and an outlet portion. The inlet portion has an inlet port for connecting to an outlet opening of a portable gas tank. The outlet portion communicates with the decompression chamber and has an outlet port. The pressure regulating assembly is disposed in the decompression chamber. The pressure regulating assembly regulates the pressure of gas outputted by the portable gas tank to form an output gas with a predetermined pressure. The switching assembly is disposed on the outlet portion and is located between the decompression chamber and the outlet port and is manipulatable to block or open the output gas, thereby regulating the pressure of the output gas outputted by the portable gas tank.

13 Claims, 16 Drawing Sheets

(56) References Cited

U.S. PATENT DOCUMENTS

| | | | | |
|---|---|---|---|---|
| 10,316,985 B2 * | 6/2019 | Tatarek | ............... | F16K 31/42 |
| 2006/0157122 A1 * | 7/2006 | Kawamura | .......... | G05D 16/103 |
| | | | | 137/613 |
| 2007/0157977 A1 * | 7/2007 | Dean | ................ | F16K 1/307 |
| | | | | 137/613 |
| 2018/0306436 A1 * | 10/2018 | Huang | ............... | F23N 1/007 |

FOREIGN PATENT DOCUMENTS

| | | |
|---|---|---|
| TW | 202004088 A | 1/2020 |
| TW | M614177 U | 7/2021 |
| WO | 9913945 A1 | 3/1999 |
| WO | 2015150803 A1 | 10/2015 |
| WO | 2018020267 A1 | 2/2018 |

\* cited by examiner

PRESSURE-REGULATING DEVICE

BACKGROUND OF THE INVENTION

Technical Field

The present invention relates generally to a gas tank, and more particularly to a pressure regulating device applying to a gas tank.

Description of Related Art

In recent years, outdoor leisure activities such as camping or climbing in the wild have become popular for people to get away from the hustle and bustle. Cooking is often required for outdoor activities. Therefore, there are also many different outdoor gas stoves for people to choose from. Outdoor gas stoves use canned gas (usually the camping gas tank) to provide the required gas.

The camping gas tank is filled with high-pressure liquid gas. Generally, a needle valve is installed at an outlet of the camping gas tank and is connected to a burner of a gas stove via a gas pipe, wherein the needle valve is adapted to regulate an output amount of gas to output a small amount of high-pressure gas inside the camping gas tank.

However, if the needle valve is not working, the high-pressure gas inside the camping gas tank may be sprayed out in a large amount, causing a large amount of gas leakage, which may even be ignited.

Therefore, the way that the camping gas tank regulates the output amount of gas still has room for improvement.

BRIEF SUMMARY OF THE INVENTION

In view of the above, the primary objective of the present invention is to provide a pressure regulating device, which could regulate a pressure of gas outputted by a portable gas tank.

The present invention provides a pressure-regulating device adapted to be connected to an outlet opening of a portable gas tank, including a pressure stabilizer, wherein the pressure stabilizer includes a valve body, a pressure regulating assembly, and a switching assembly. The valve body has an inlet portion, a decompression chamber, and an outlet portion. The inlet portion has an inlet port adapted to be connected to the outlet opening of the portable gas tank. The decompression chamber communicates with the inlet portion. The outlet portion communicates with the decompression chamber. The outlet portion has an outlet port. The pressure regulating assembly is disposed in the decompression chamber and is adapted to regulate a pressure of a gas outputted by the portable gas tank to form an output gas with a predetermined pressure. The switching assembly is disposed in the outlet portion, and is located between the decompression chamber and the outlet port, and is manipulable to block or open the output gas.

With the aforementioned design, the pressure stabilizer could reduce and regulate the pressure of the gas outputted by the portable gas tank, thereby stably output the output gas with the predetermined pressure. The switching assembly in the pressure stabilizer could control the output gas to open or close, which is convenient.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A pressure regulating device 1 according to an embodiment of the present invention is illustrated in FIG. 1 to FIG. 16 and at least includes a pressure stabilizer 10, wherein the pressure stabilizer 10 is connected to an outlet opening 100a of the portable gas tank 100. The portable gas tank 100 is a camping gas tank as an example and is filled with high-pressure liquid gas therein. The pressure stabilizer 10 is adapted to regulate a pressure of gas outputted by the portable gas tank 100.

Figure 1:
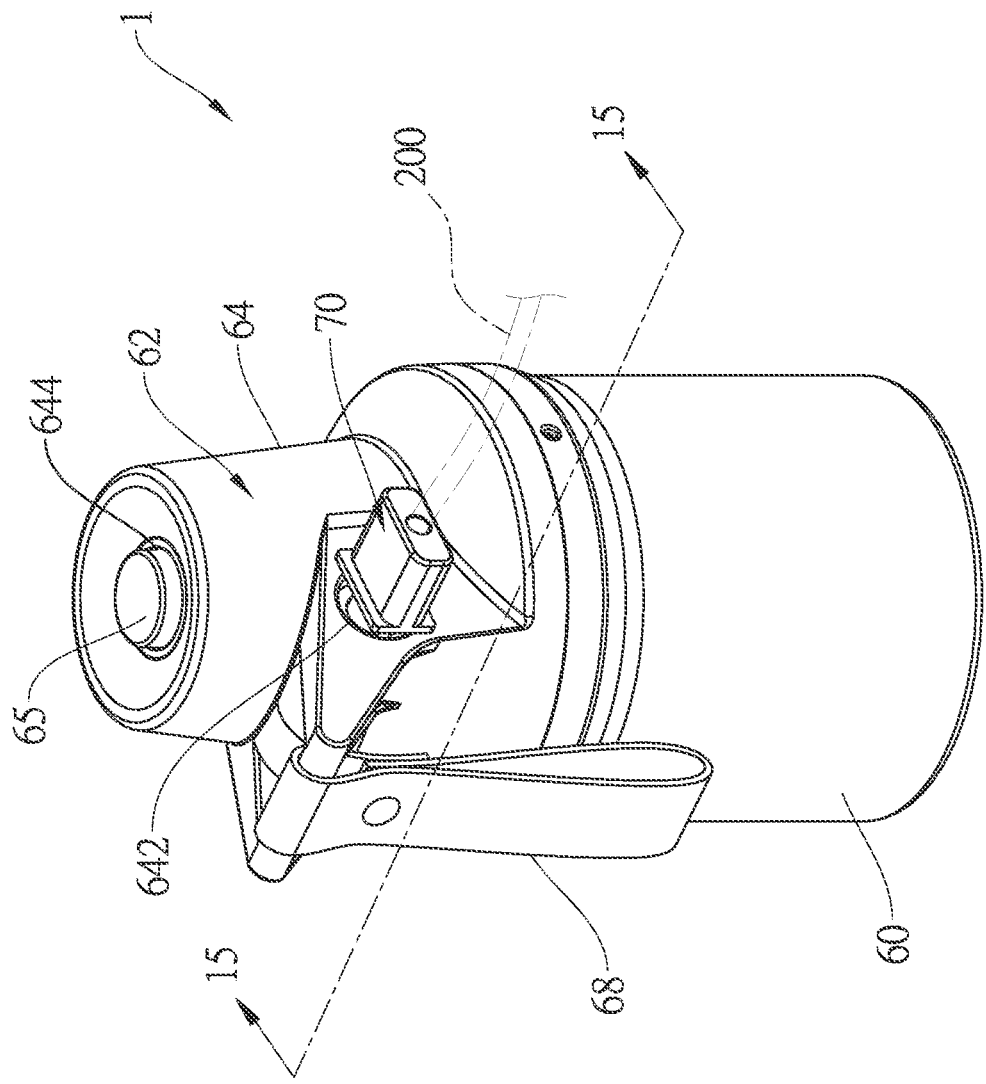
FIG. 1 is a perspective view of the pressure regulating device according to an embodiment of the present invention.
Figure 2:
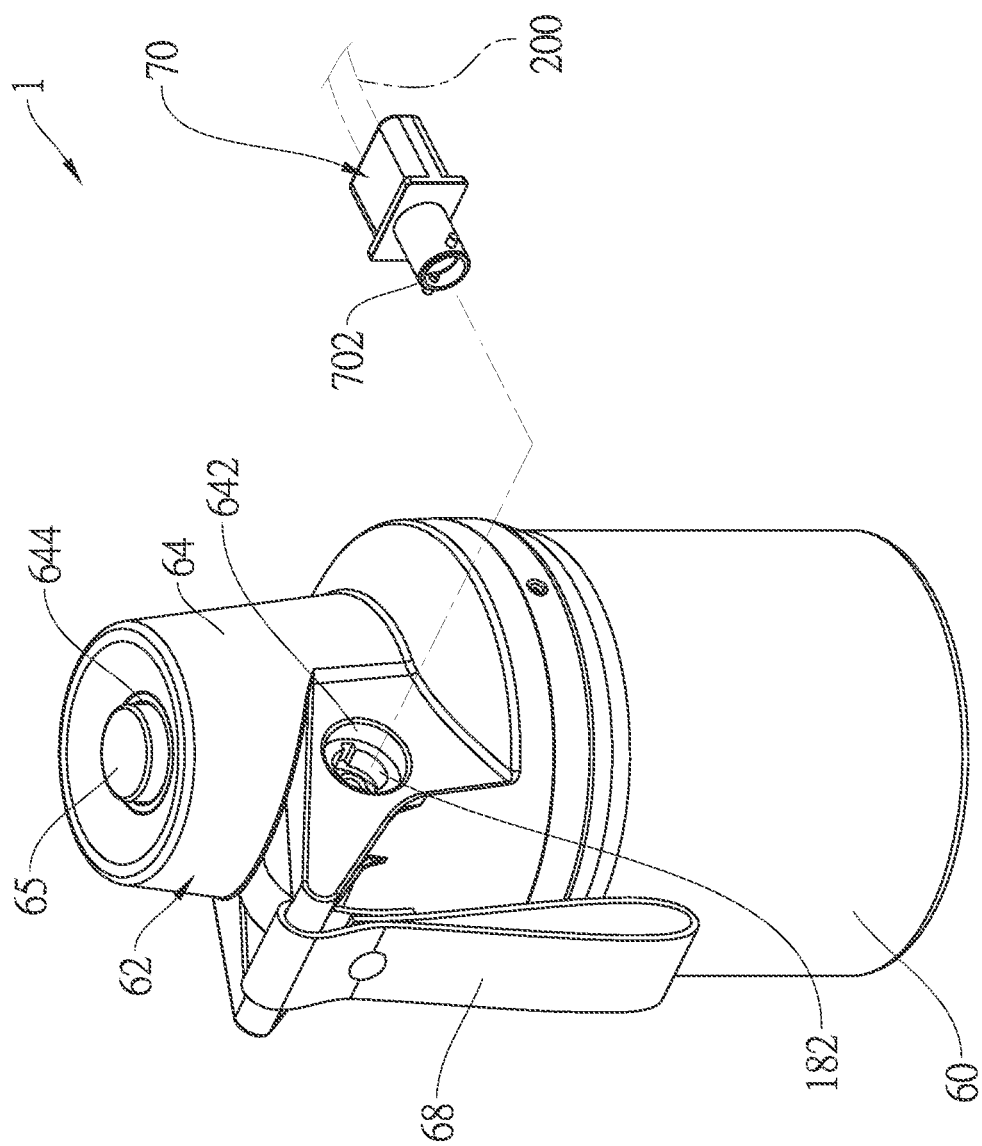
FIG. 2 is an exploded perspective view of the pressure regulating device according to the embodiment of the present invention.
Figure 3:
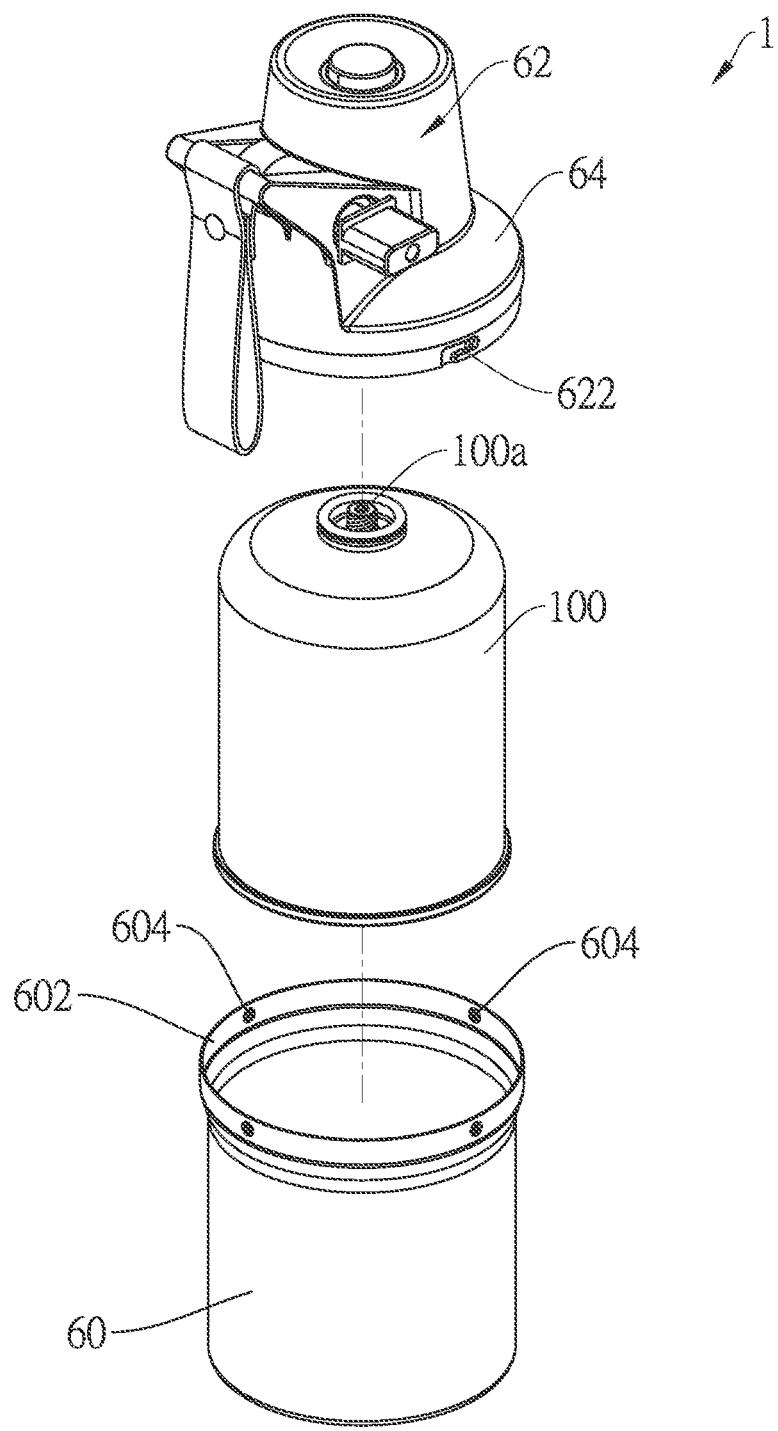
FIG. 3 is another exploded perspective view of the pressure regulating device according to the embodiment of the present invention.
Figure 4:
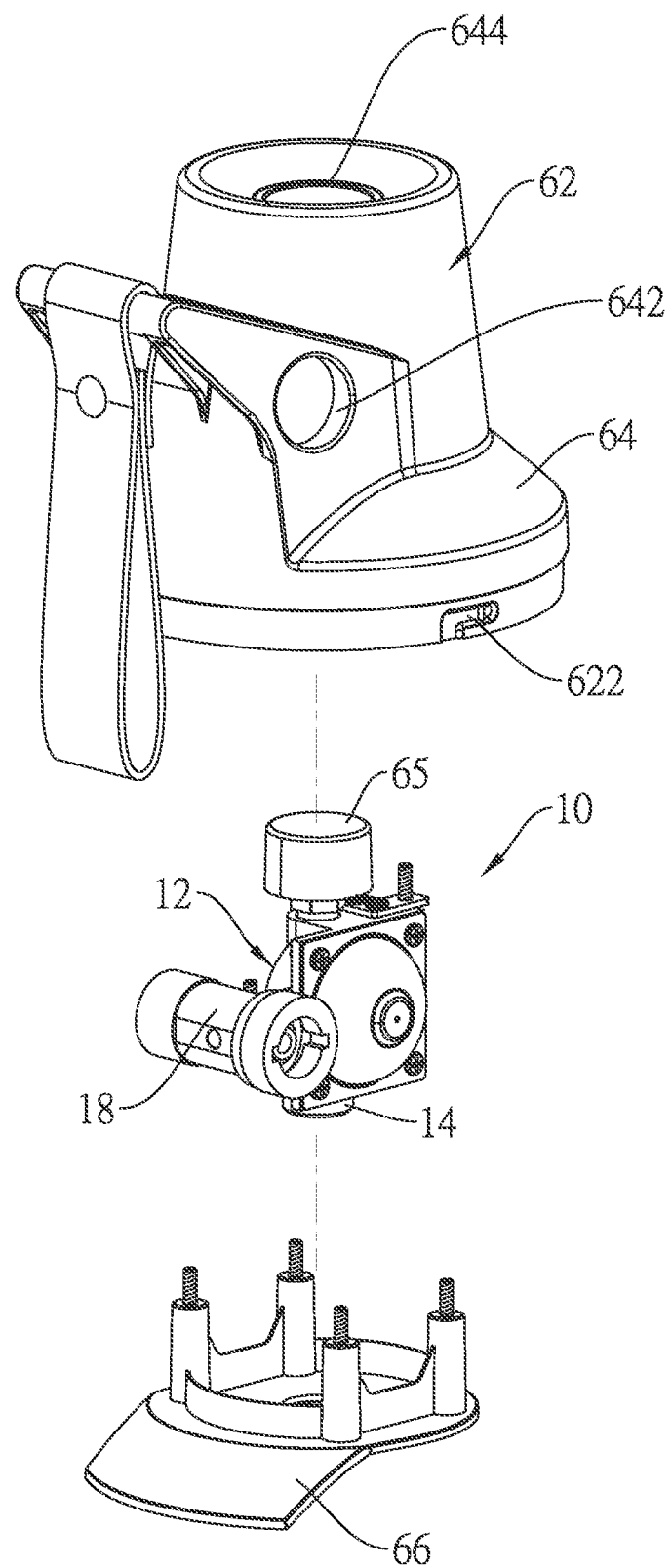
FIG. 4 is an exploded perspective view, showing the cover and the pressure stabilizer according to the embodiment of the present invention.
Figure 5:
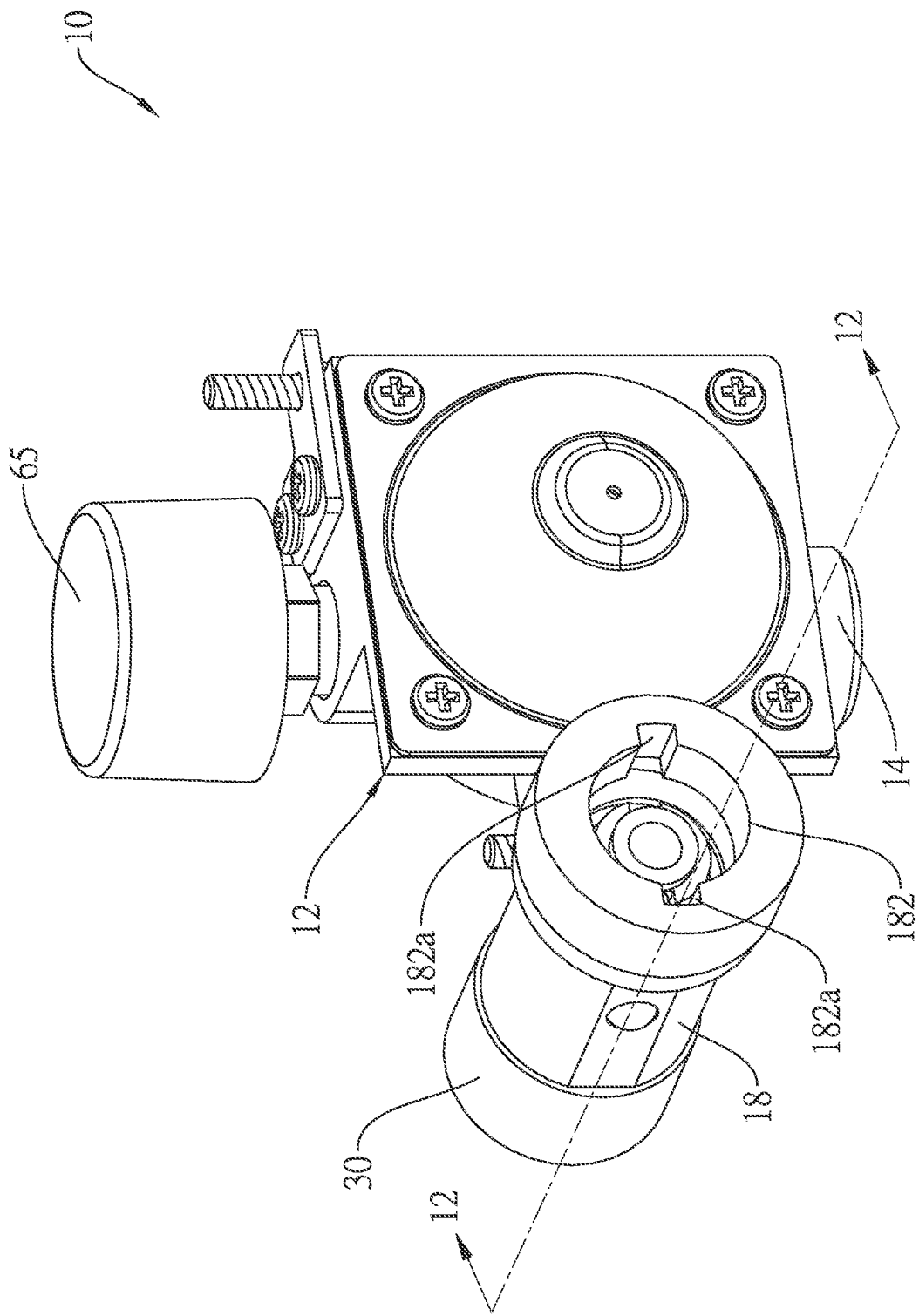
FIG. 5 is a perspective view of the pressure stabilizer according to the embodiment of the present invention.
Figure 6:
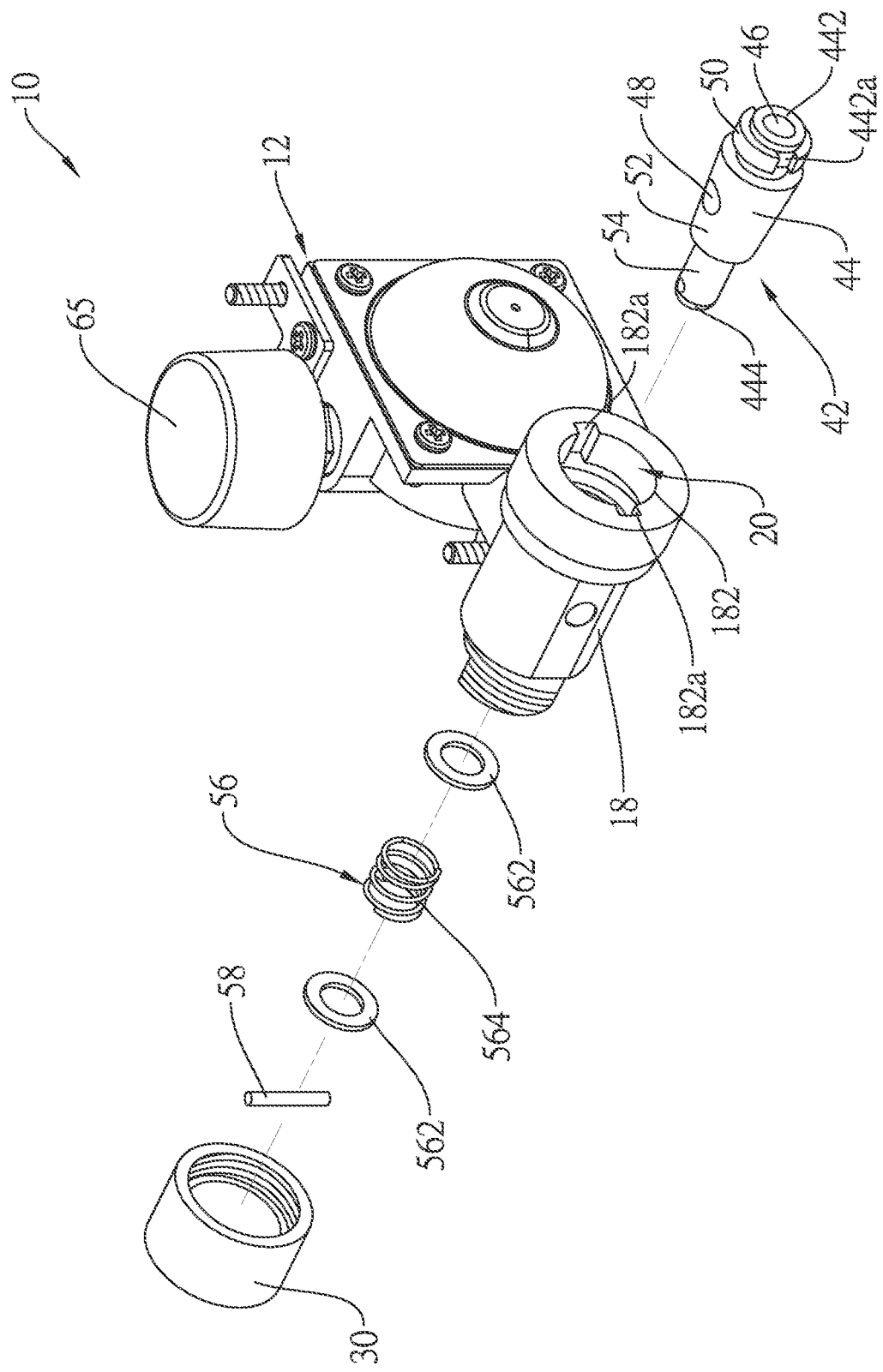
FIG. 6 is an exploded perspective of the pressure stabilizer according to the embodiment of the present invention.

Referring to FIG. 2 and FIG. 3, in the current embodiment, the pressure regulating device 1 further includes a casing 60 and a cover 62, wherein the casing 60 has a top opening 602 and is adapted to receive the portable gas tank 100, and a top portion of the portable gas tank 100 is located at the top opening 602. An inner wall of the casing 60 has a plurality of protrusions 604 located around the top opening 602.

The cover 62 is detachably engaged with the casing 60 and seals the top opening 602. In the current embodiment, a plurality of slots is disposed on an outer peripheral surface of a bottom portion of the cover 62, and the protrusions 604 of the casing 60 are engaged with the slots 622 respectively, thereby engaging the cover 62 and the casing 60. The cover 62 includes a cover body 64 and a bottom plate 66, wherein a receiving space is formed between the cover body 64 and the bottom plate 66. The cover body 64 has a first opening 642 and a second opening 644, wherein the first opening 642 is located at a side portion of the cover body 64, and the second opening 644 is located at a top portion of the cover body 64. The first opening 642 and the second opening 644 respectively communicate with the receiving space. A hanging member 68 could be selectively disposed on the cover 62 for the user to lift or suspend the pressure regulating device 1.

The pressure stabilizer 10 is disposed in the receiving space of the cover 62 and includes a valve body 12, a pressure regulating assembly 32, and a switching assembly 42, wherein the valve body 12 has an inlet portion 14, a decompression chamber 16, and an outlet portion 18.

Figure 10:
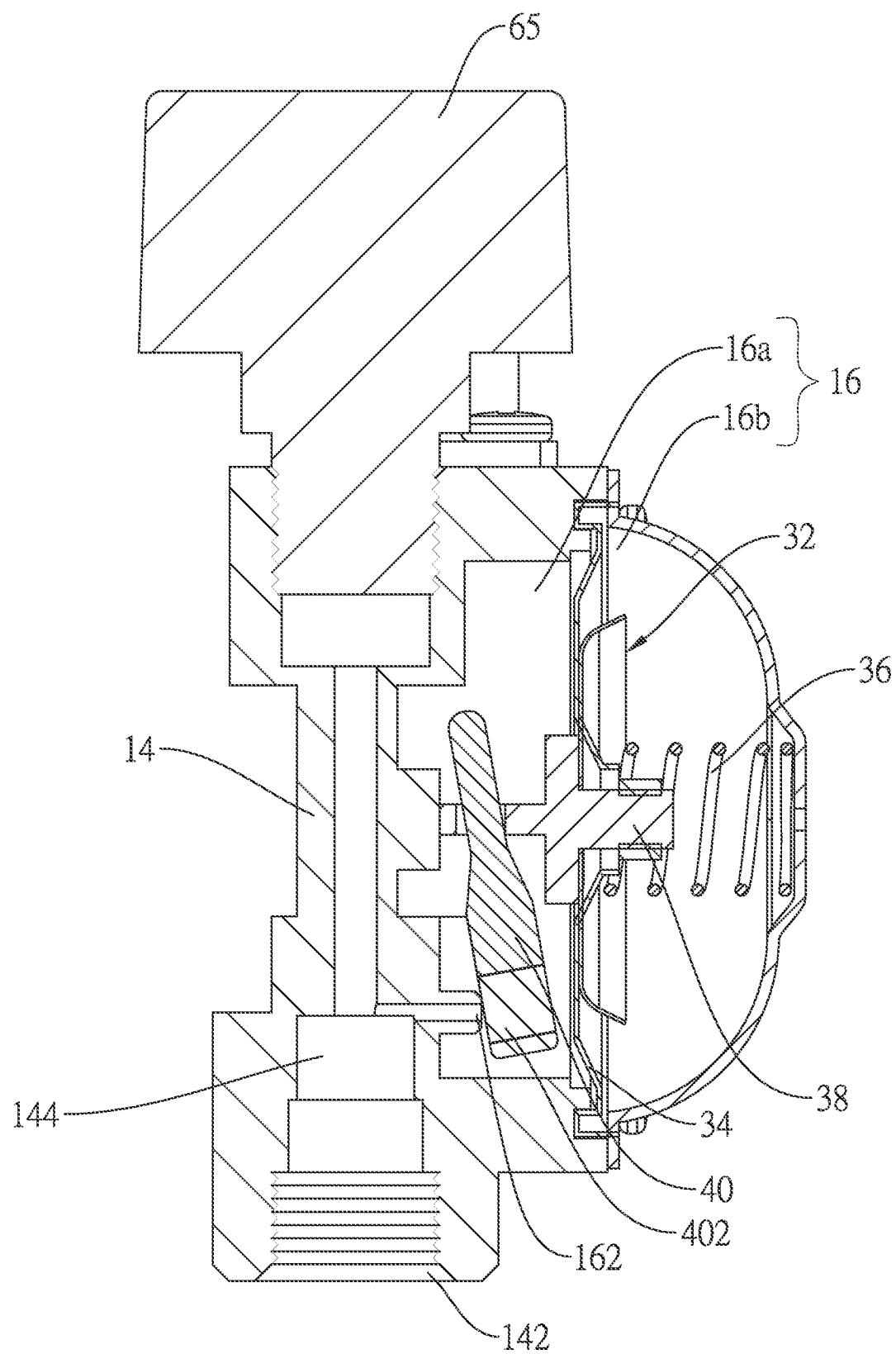
FIG. 10 is a sectional view along the 10-10 line in FIG. 9.

An end of the inlet portion 14 has an inlet port 142 which is adapted to be connected to the outlet opening 100a of the portable gas tank 100, wherein an inner wall of the inlet port 142 has an internal threaded section which is adapted to be screwed with an outer threaded section around the outlet opening 100a of the portable gas tank 100. As shown in FIG. 10, the inlet portion 14 has an inlet passage 144 extending along an axial direction of the inlet portion 14, and an end of the inlet passage 144 communicates with the inlet port 142.

In the current embodiment, a pressure gauge 65 is disposed on a top portion of the inlet portion 14, and another end of the inlet passage 144 extends to the top portion of the inlet portion 14. The pressure gauge 65 communicates with the another end of the inlet passage 144 for measuring a pressure in the inlet passage 144 (i.e., the pressure gauge could detect a pressure of a gas of the portable gas tank 100. The pressure gauge 65 is located in the second opening 644 of the cover 62 for the user to observe a pressure indicated by the pressure gauge 65. In practice, the pressure gauge 65 could be a pressure gauge of pointer type or digital type.

The decompression chamber 16 is located at a side of the inlet portion 14, and has a valve opening 162 therein (as shown in FIG. 10), wherein the decompression chamber 16 communicates with the inlet passage 144 of the inlet portion 14 via the valve opening 162.

Figure 11:
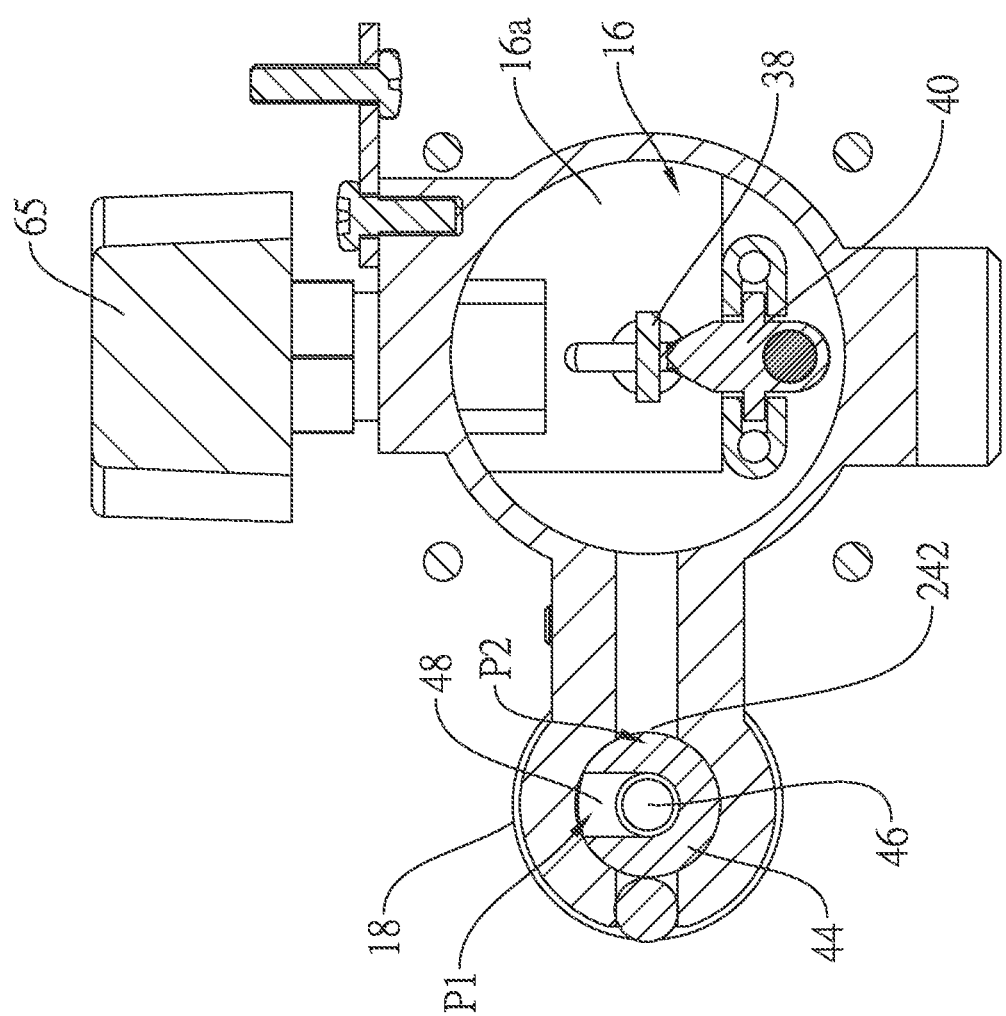
FIG. 11 is a sectional view along the 11-11 line in FIG. 9.

Referring to FIG. 10 and FIG. 11, the pressure regulating assembly 32 is disposed in the decompression chamber 16 for regulating the pressure of gas outputted by the portable gas tank 100, thereby reducing the pressure of gas and stabilize the output gas with a predetermined pressure. In the current embodiment, the predetermined pressure is 280 mm/H2O as an example. In the current embodiment, the pressure regulating assembly 32 includes a film 34, a spring 36, a movable member 38, and a covering member 40, wherein the film 34 divides the decompression chamber 16 into a first sub-chamber 16a and a second sub-chamber 16b. The first sub-chamber 16a communicates with the inlet passage 144 via the valve opening 162 and communicates with the outlet portion 18. The spring 36 is located in the second sub-chamber 16b and abuts against the valve body 12 and the film 34. The movable member 38 is connected to the film 34. The covering member 40 is pivotally connected to the valve body 12 and is connected to the movable member 38 and has a cover portion 402 located at a position corresponding to the valve opening 162. In this way, when the pressure of the gas inside the portable gas tank 100 is sufficient to push the film 34 toward the spring 36 to drive the cover portion 402 of the covering member 40 to open the valve opening 162 in a small extent to reduce a pressure of the first sub-chamber 16a to form the output gas with the predetermined pressure. As the pressure of gas in the portable gas tank 100 decreases, the pressure of the first sub-chamber 16a decreases, so that the spring 36 pushes the film 34 toward the valve opening 162, driving the cover portion 402 of the covering member 40 gradually moves away from the valve opening 162 to increase an opening extent of the valve opening 162, thereby the pressure in the first sub-chamber 16a could be maintained at the stable predetermined pressure.

The outlet portion 18 is located at a side of the decompression chamber 16 and communicates with the first sub-chamber 16a of the decompression chamber 16. The outlet portion 18 has an outlet port 182, wherein a location of the outlet port 182 corresponds to the first opening 642 of the cover 62.

The switching assembly 42 is disposed in the outlet portion 18 and is located between the decompression chamber 16 and the outlet port 182, wherein the switching assembly 42 is manipulable to block or open the output gas.

Figure 12:
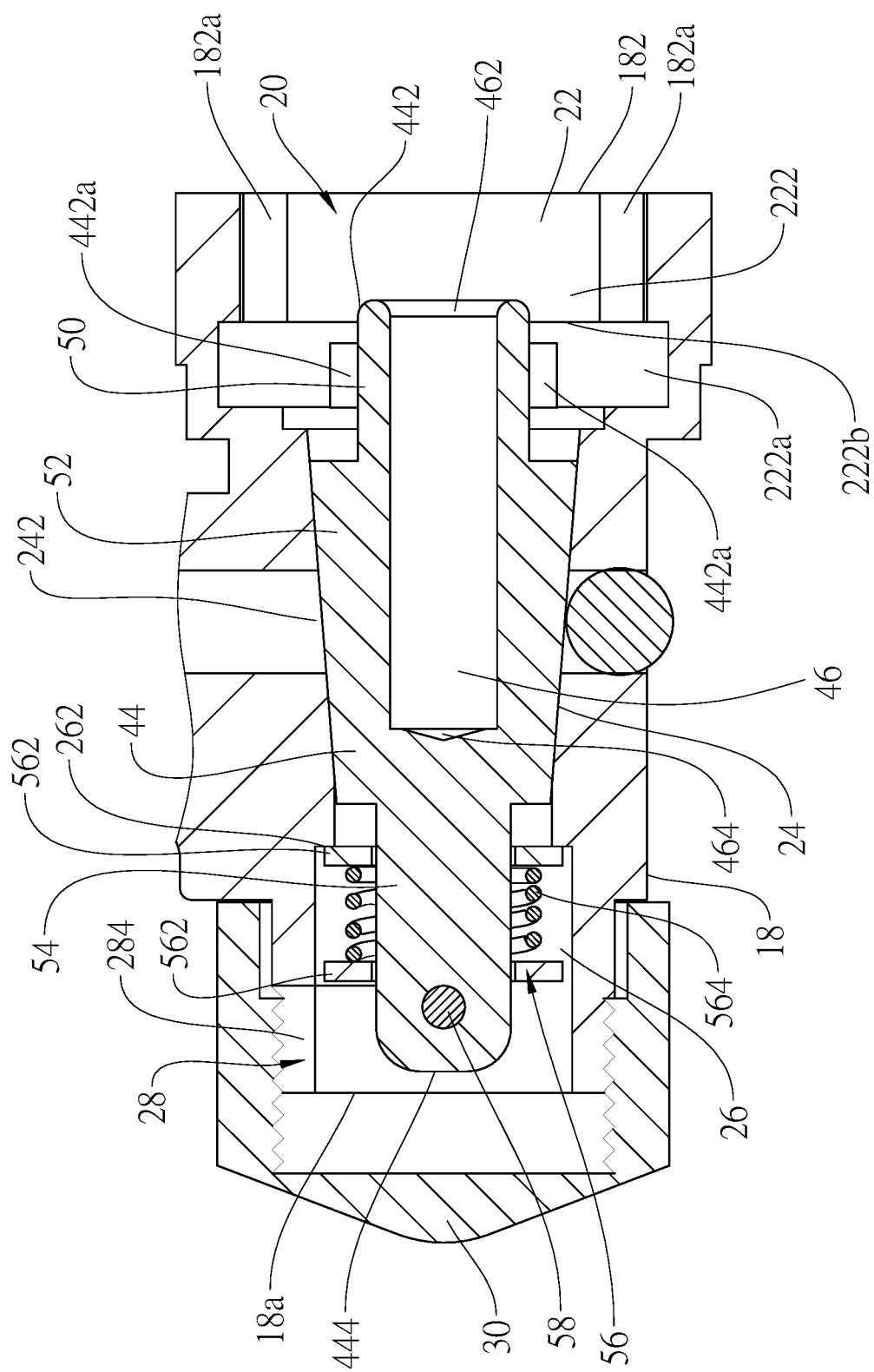
FIG. 12 is a sectional view along the 12-12 line in FIG. 5.
Figure 13:
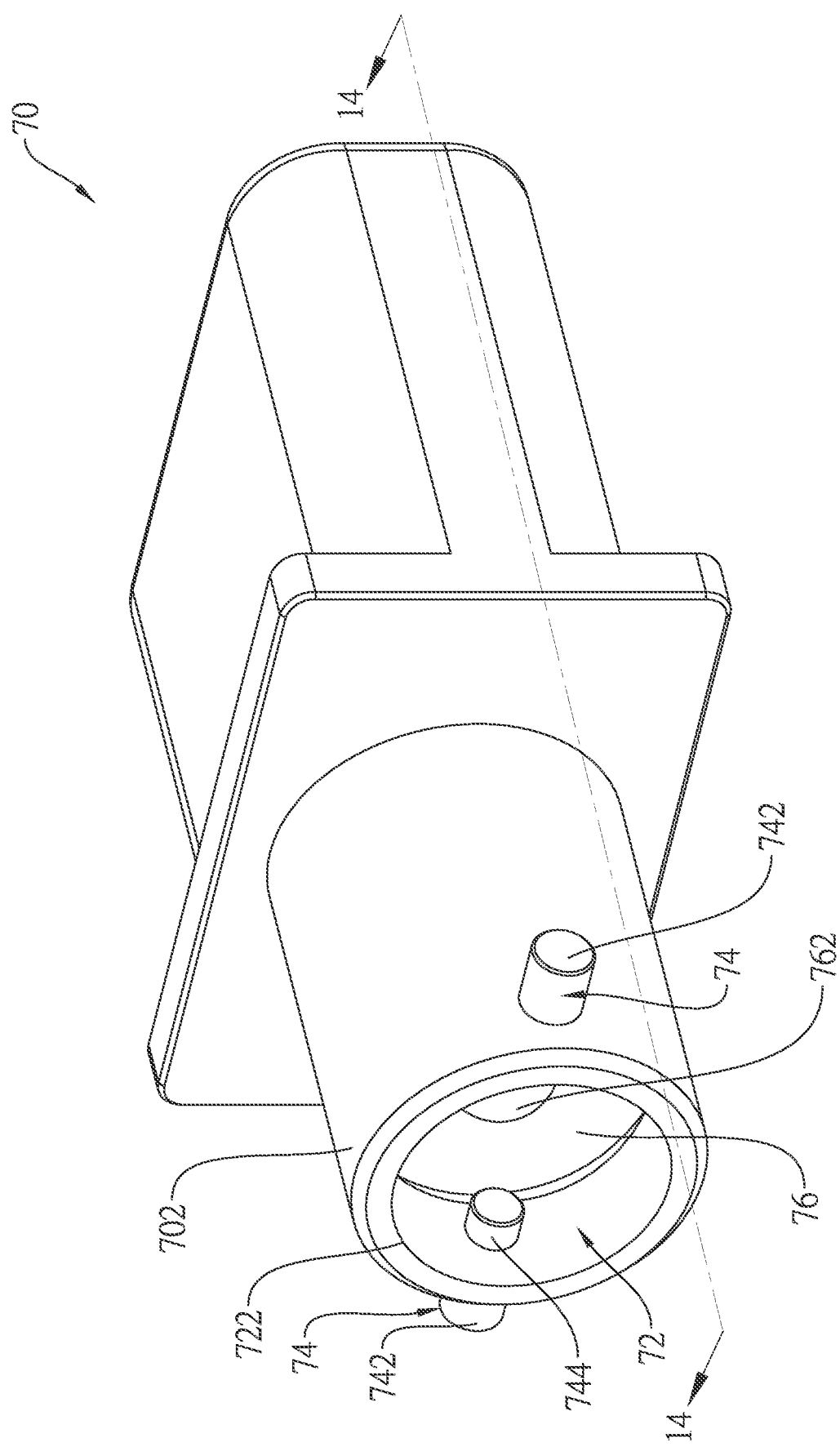
FIG. 13 is a perspective view of the manipulating member according to the embodiment of the present invention.
Figure 14:
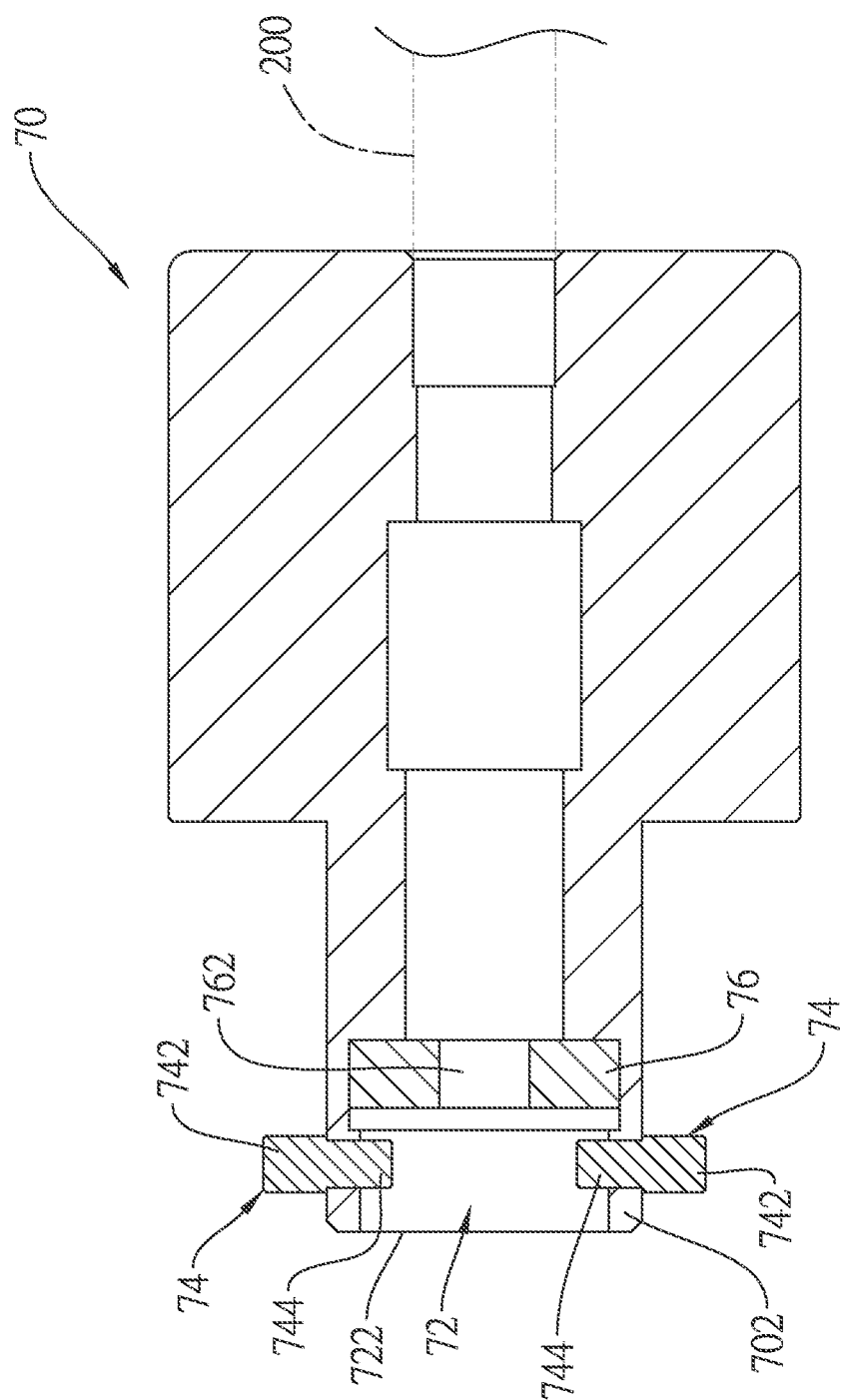
FIG. 14 is a sectional view along the 14-14 line in FIG. 13.

More specifically, referring to FIG. 11 and FIG. 12, the outlet portion 18 has a receiving hole 20, wherein the receiving hole 20 has a first section 22, a second section 24, and a third section 26 connected in sequence along an axial direction thereof. The outlet port 182 is located at the first section 22. The first section 22 has a connecting passage 222. The second section 24 is located between the first section 22 and the third section 26 and forms a receiving chamber, wherein a hole wall of the second section 24 is tapered in shape. More specifically, a diameter of the second section 24 gradually decreases in a direction from the first section 22 to the third section 26. The hole wall of the second section 24 has a side opening 242 communicating with the decompression chamber 16. A junction between the third section 26 and the second section 24 has a shoulder portion 262. An inner wall of the connecting passage 222 (i.e., a hole wall of the first section 22) has an annular groove 222a. An end portion of the outlet port 182 has at least one recess 182a. In the current embodiment, a number of the at least one recess 182a is two, and the two recesses 182a communicate with the annular groove 222a. The annular groove 222a has a groove wall 222b facing the second section 24.

Figure 8:
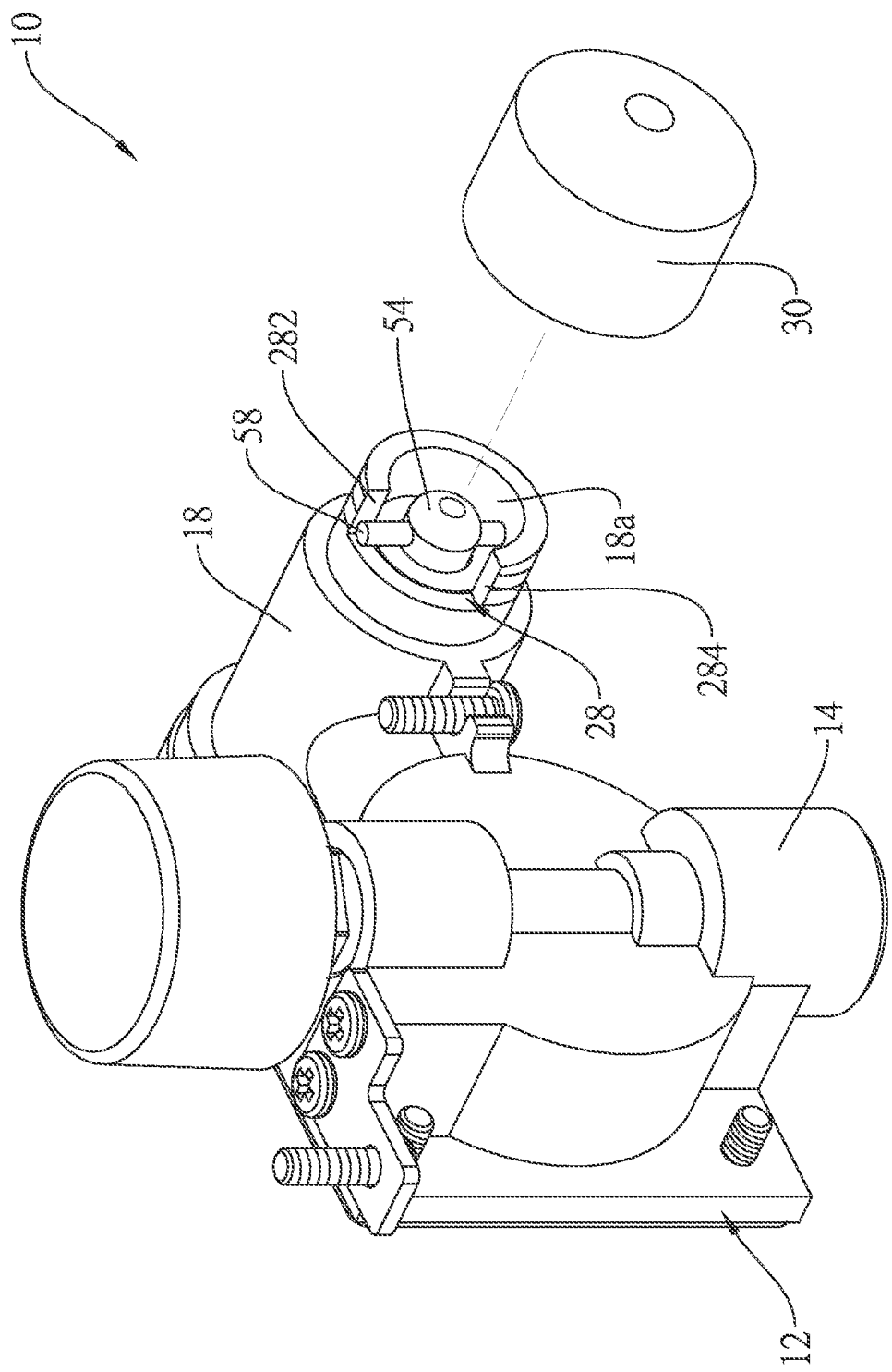
FIG. 8 is another exploded perspective view of the pressure stabilizer according to the embodiment of the present invention.
Figure 9:
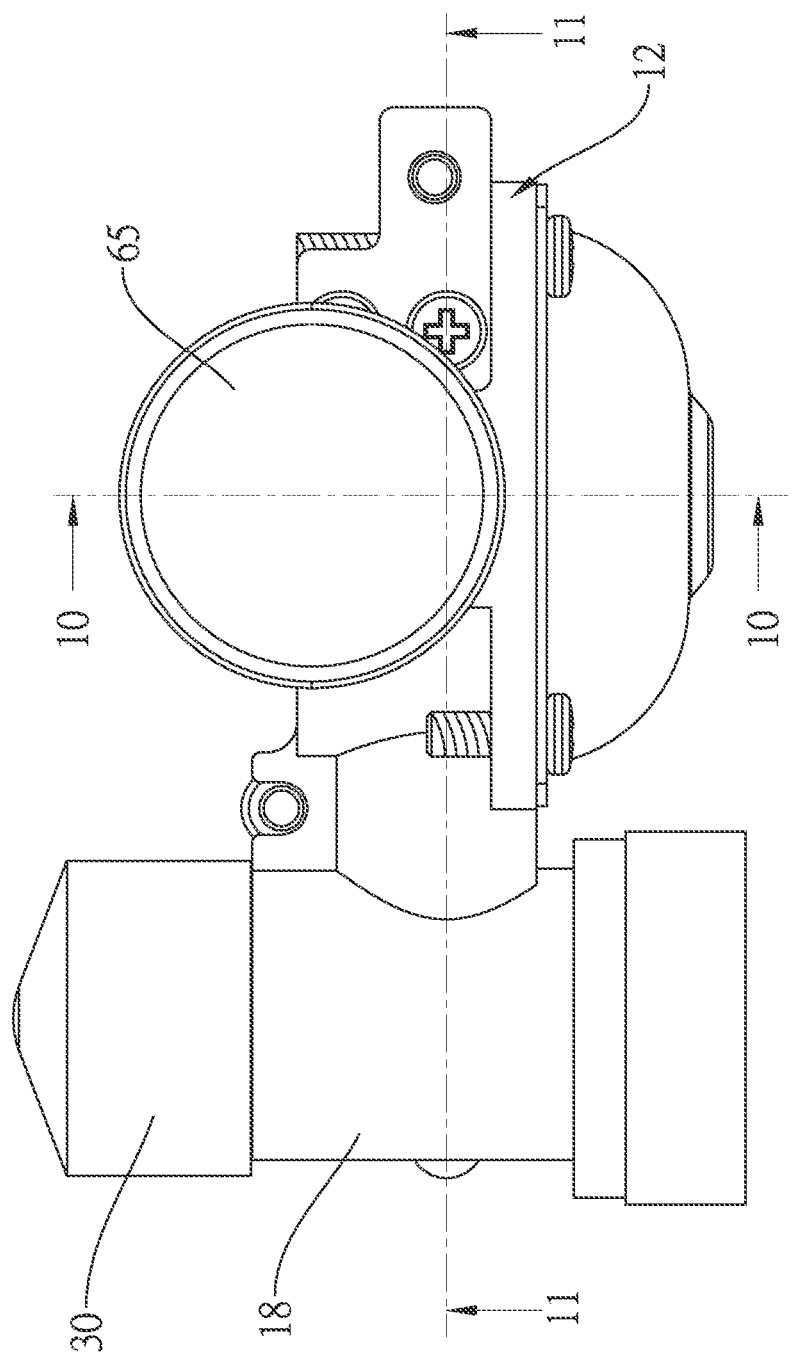
FIG. 9 is a top view of the pressure stabilizer according to the embodiment of the present invention.

Additionally, the outlet portion 18 has a restricting groove 28 located at a radial periphery of the third section 26 and communicating with the third section 26. Two end walls of the restricting groove 28 respectively form a first blocking portion 282 and a second blocking portion 284 (as shown in FIG. 8). In the current embodiment, the outlet portion 18 has an open end 18a at an outer side of the third section 26, and a rear cover 30 is engaged around a radial periphery of the third section 26 in a threaded way to close the open end 18a.

The switching assembly 42 includes a plug member 44, wherein the plug member 44 has a first end 442 and a second end 444 opposite to the first end 442 in an axial direction thereof. At least a part of the plug member 44 is located in the second section 24 of the receiving hole 20. The plug member 44 has an axial hole 46 and a through hole 48 located in a radial direction of the plug member 44, wherein the axial hole 46 communicates with the through hole 48 and the outlet port 182. More specifically, the plug member 44 includes a driving section 50, a tapered section 52, and an extending section 54, wherein the driving section 50 has the first end 442, and the tapered section 52 is located between the driving section 50 and the extending section 54, and the driving section 50 is located at the first section 22. The tapered section 52 is located at the second section 24, wherein an outer peripheral surface of the tapered section 52 matches with the hole wall of the second section 24. The extending section 54 is located at the third section 26 and has the second end 444.

The axial hole 46 has an open side 462 and a close side 464, wherein the open side 462 is formed at the first end 442, and the close side 464 is located at the tapered section 52 and is located between the first end 442 and the second end 444. The through hole 48 is located on the tapered section 52.

The first end 442 has at least one notch 442a. In the current embodiment, referring to FIG. 6, a number of the at least one notch 442a is two, wherein the two notches 442a are located at two opposite sides of a radial periphery of the axial hole 46. The annular groove 222a of the outlet port 182 surrounds a radial periphery of the two notches 442a.

The switching assembly 42 further includes an elastic member 56, wherein an end of the elastic member 56 abuts against the shoulder portion 262, while another end of the elastic member 56 exerts a force on the extending section 54 in a direction away from the shoulder portion 262, so that the outer peripheral surface of the tapered section 52 could tightly abut against the hole wall of the second section 24. In the current embodiment, the switching assembly 42 includes a blocking member which is a blocking rod 58 as an example, wherein the blocking rod 58 is disposed at the extending section 54 of the plug member 44 and extends in a radial periphery of the extending section 54. Another end of the elastic member 56 abuts against the blocking rod 58. The elastic member 56 includes a spring 564 and two blocking plates 562 fitting around the extending section 54, wherein the spring 564 is located between the two blocking plates 562. One of the blocking plates 562 forms an end of the elastic member 56 and abuts against the shoulder portion 262, while the other blocking plate 562 forms another end of the elastic member 56 and abuts against the blocking rod 58. An end of the blocking rod 58 extends into the restricting groove 28 and is located between the first blocking portion 282 and the second blocking portion 284 for restricting a rotation angle of the plug member 44.

Figure 7:
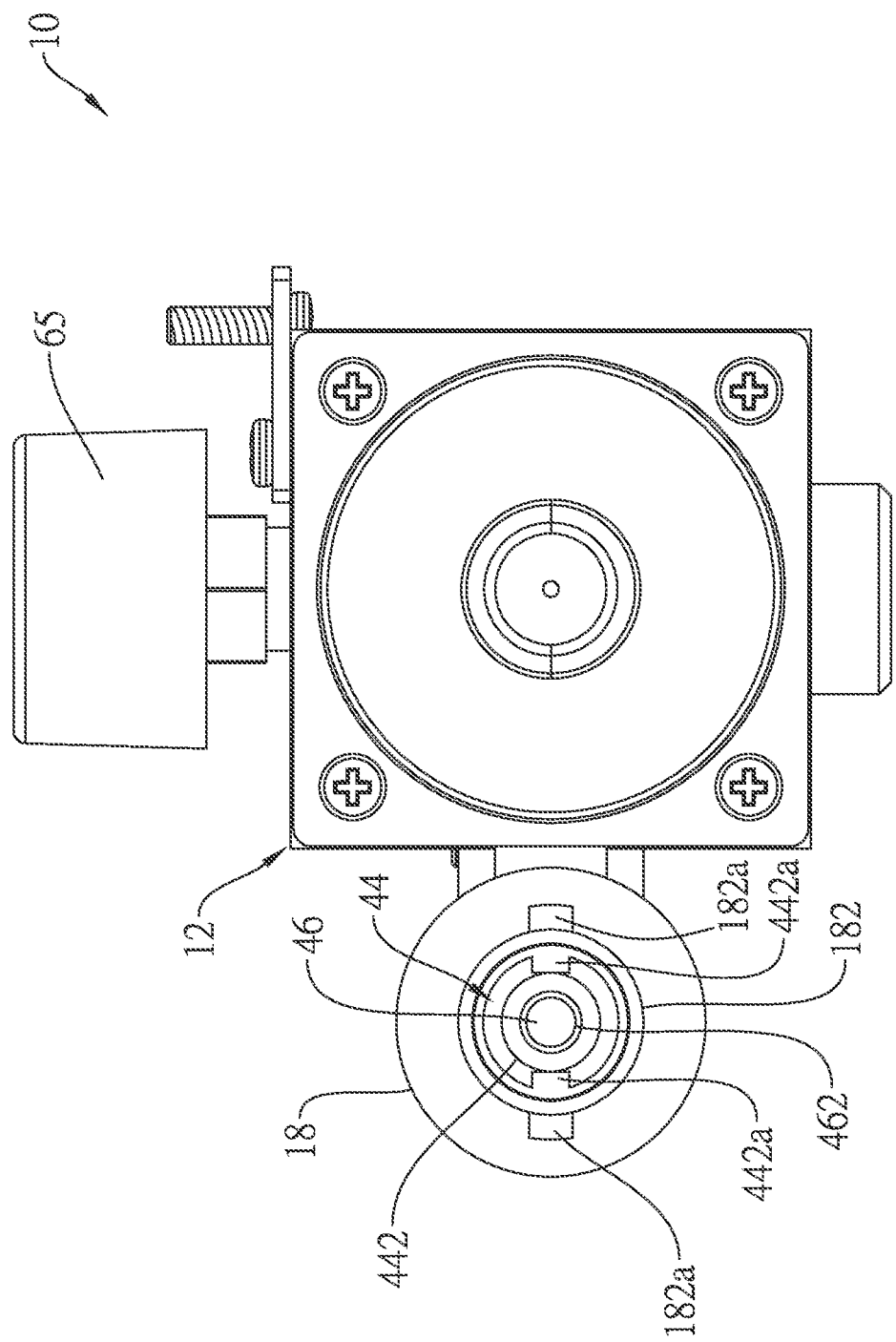
FIG. 7 is a front view of the pressure stabilizer according to the embodiment of the present invention.
Figure 15:
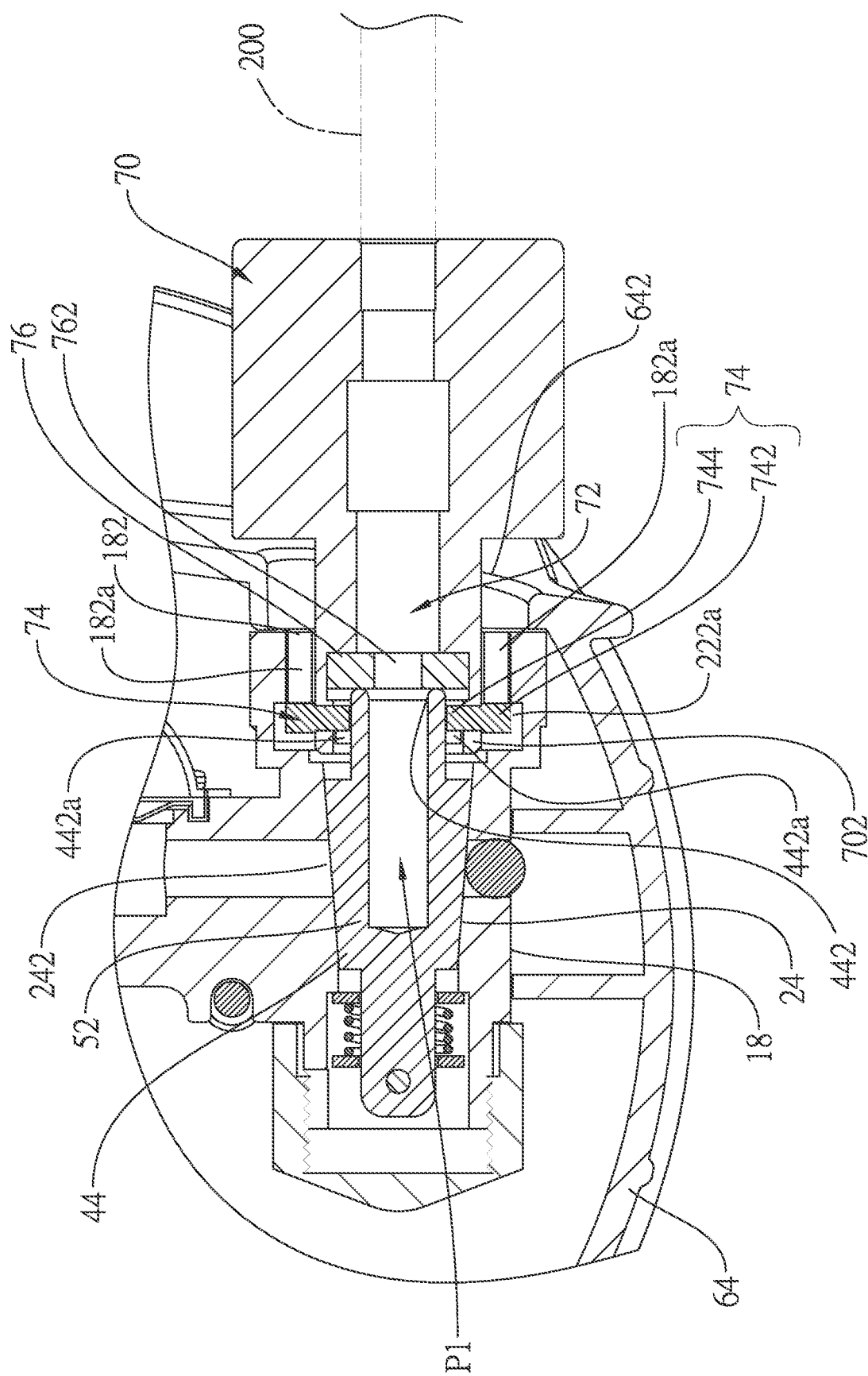
FIG. 15 is a sectional view along the 15-15 line in FIG. 1.
Figure 16:
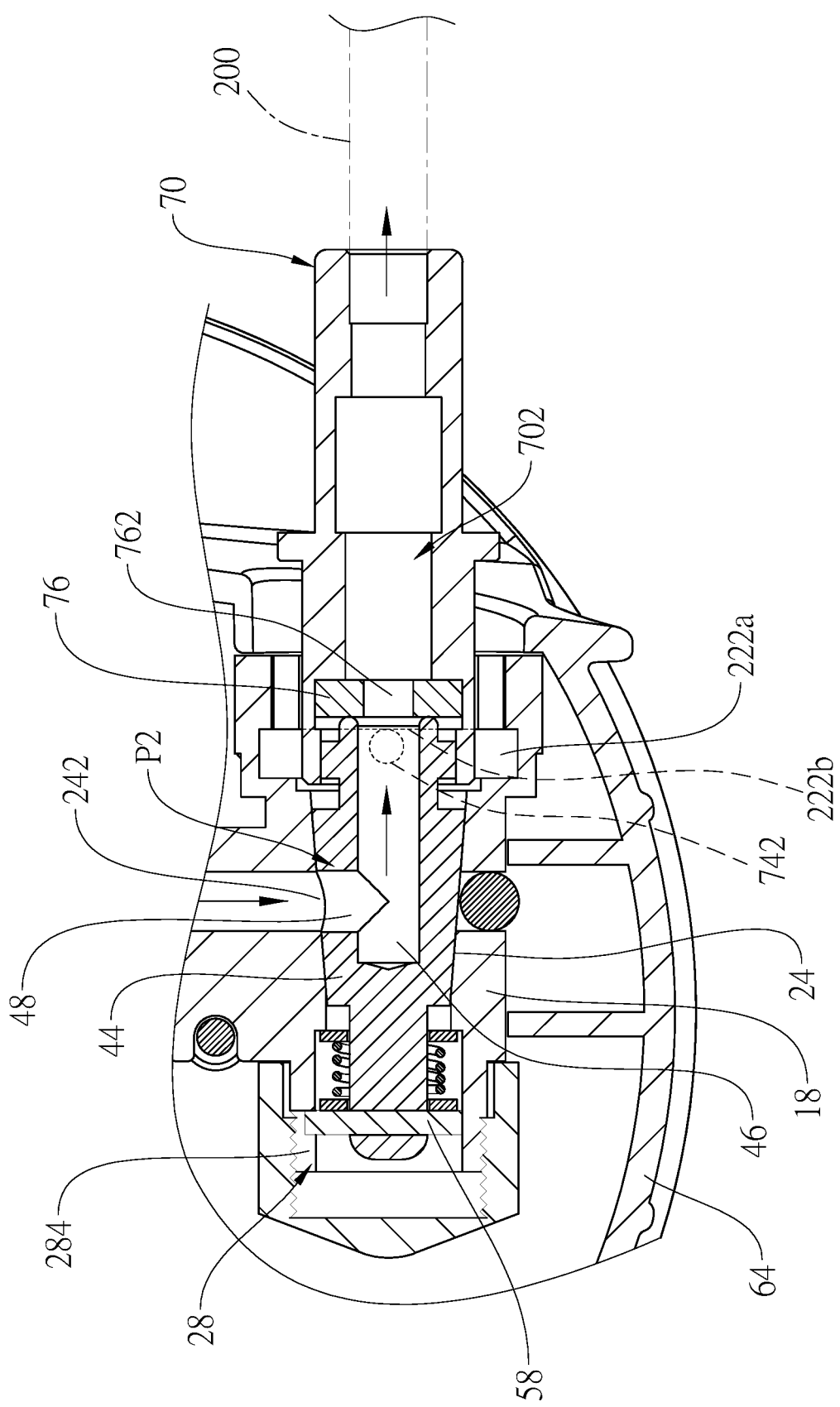
FIG. 16 is a schematic view, showing the manipulating member drives the plug member to open the side opening.

Referring to FIG. 11, FIG. 15, and FIG. 16, the plug member 44 is manipulable to turn in the axial direction of the plug member 44 between a first position P1 and a second position P2. Referring to FIG. 15, when the plug member 44 is at the first position P1, the outer peripheral surface of the tapered section 52 of the plug member 44 closes the side opening 242 to block the output gas, and the notches 442a on the first end 442 of the plug member 44 and the recess 182a of the outlet port 182 are located at the same reference plane (as shown in FIG. 7), and the blocking rod 58 abuts against the first blocking portion 282. Referring to FIG. 16, when the plug member 44 is at the second position P2, the blocking rod 58 abuts against the second blocking portion 284, and the through hole 48 communicates with the side opening 242 to open the output gas, allowing the output gas being outputted through the outlet port 182.

To easily manipulate the plug member 44, in the current embodiment, the pressure regulating device 1 further includes a manipulating member 70, wherein the manipulating member 70 has a connecting end 702 and has a gas passage 72 therein. An end of the gas passage 72 forms an inlet 722 at the connecting end 702, while another end of the gas passage 72 is adapted to communicate with a gas pipe 200, wherein the gas pipe 200 could be a hose and be connected to a gas apparatus. The manipulating member 70 is detachably connected to the outlet port 182 via the connecting end 702, and the connecting end 702 is connected to the plug member 44, and the gas passage 72 communicates with the axial hole 46. The manipulating member 70 drives the plug member 44 to turn between the first position P1 and the second position P2.

More specifically, referring to FIG. 13 to FIG. 16, the connecting end 702 of the manipulating member 70 is configured with at least one positioning member 74. In the current embodiment, a number of the at least one positioning member 74 is two. When the plug member 44 is located at the first position P1, each of the positioning members 74 could enter the annular groove 222a via one of the recesses 182a of the outlet port 182, and could further enter one of the notches 442a of the plug member 44.

In the current embodiment, the positioning members 74 are disposed in a radial direction of the connecting end 702, wherein each of the positioning members 74 has an outer end 742 protruding out of a radial periphery of the connecting end 702 and an inner end 744 located in the gas passage 72. A sealing member 76 is disposed in the gas passage 72 and has a through hole 762 communicating with the gas passage 72.

When the plug member 44 is located at the first position P1 and the connecting end 702 is connected to the plug member 44, the outer end 742 of each of the positioning members 74 enters the annular groove 222a via one of the recesses 182a, and the inner end 744 of each of the positioning members 74 enters one of the notches 442a. The first end 442 of the plug member 44 is located in the gas passage 72 and abuts against the sealing member 76. The open side 462 of the axial hole 46 communicates with the through hole 762 and the gas passage 72. When the user turns the manipulating member 70, the inner end 744 of each of the positioning members 74 abuts against a wall of each of the notches 442a to drive the plug member 44 to turn to the second position P2 in the axial direction thereof. During the turn, when the outer end 742 of each positioning member 74 leaves a projection range of one of the recesses 182a, the groove wall 222b of the annular groove 222a restricts the outer end 742 of each positioning member 74 to the annular groove 222a (as shown at the dotted line in FIG. 16). In this way, when the plug member 44 turns from the first position P1 to the second position P2, the annular groove 222a restricts the manipulating member 70 from disengaging, and the first end 442 of the plug member 44 stably abuts against the sealing member 76, thereby the output gas outputted from the axial hole 46 of the plug member 44 could enter the gas passage 72 of the manipulating member to be transmitted to the gas pipe 200.

When the user does not use gas, the manipulating member 70 could be turned in a reverse direction, and the plug member 44 could be turned back to the first position P1, so that the plug member 44 could block the gas, and the manipulating member 70 could be removed from the outlet port 182 of the valve body 12, so that the user could freely move the pressure regulating device 1 and the portable gas tank 100.

With the aforementioned design, when the pressure stabilizer 10 of the present invention is connected to the portable gas tank 100, the pressure of the gas outputted by the portable gas tank 100 could be reduced and regulated, thereby to stably output the output gas with the predetermined pressure. The switching assembly 42 in the pressure stabilizer 10 could control the output gas to open or close, which is convenient. It is worth mentioning that, it is more convenient to use the output gas by using the manipulating member 70 to turn the plug member 44 to allow the output gas to be transmitted to the gas pipe 200 via the gas passage 72 in the manipulating member 70. In addition, since the plug member 44 is in the valve body 12, the plug member 44 would not be touched by mistake to lead to a problem that the output gas leaks from the outlet port 182. Moreover, the cover 62 and the casing 60 could prevent the pressure stabilizer 10 and the portable gas tank 100 from collision.

In an embodiment, the cover 62 and the casing 60 could be omitted, and the pressure stabilizer 10 is directly connected to the portable gas tank 100.

In an embodiment, the gas pipe 200 could be fixed to the outlet port 182 of the outlet portion 18, and by configuring a manipulating member (e.g. a button) on the extending section 54 of the plug member 44, the manipulating member could drive the plug member 44 to turn between the first position P1 and the second position P2.

It must be pointed out that the embodiments described above are only some preferred embodiments of the present invention. All equivalent structures which employ the concepts disclosed in this specification and the appended claims should fall within the scope of the present invention.

What is claimed is:

1. A pressure regulating device, which is adapted to be connected to an outlet opening of a portable gas tank, comprising:

a pressure stabilizer comprising a valve body, a pressure regulating assembly, and a switching assembly, wherein the valve body has an inlet portion, a decompression chamber, and an outlet portion; the inlet portion has an inlet port adapted to be connected to the outlet opening of the portable gas tank; the decompression chamber communicates with the inlet portion; the outlet portion communicates with the decompression chamber; the outlet portion has an outlet port; the pressure regulating assembly is disposed in the decompression chamber and is adapted to regulate a pressure of a gas outputted by the portable gas tank to form an output gas with a predetermined pressure; the switching assembly is disposed in the outlet portion, and is located between the decompression chamber and the outlet port, and is manipulable to block or open the output gas; and wherein the outlet portion has a receiving chamber; a wall of the receiving chamber has a side opening communicating with the decompression chamber; the switching assembly comprises a plug member located in the receiving chamber; the plug member has a through hole located at a radial direction of the plug member and an axial hole communicating with the through hole and the outlet port; the plug member is turnable between a first position and a second position in an axial direction of the plug member; when the plug member is at the first position, an outer peripheral surface of the plug member closes the side opening; when the plug member is at the second position, the through hole communicates with the side opening; a manipulating member has a connecting end and has a gas passage therein; an end of the gas passage forms an inlet at the connecting end, and another end of the gas passage is adapted to communicate with a gas pipe; the manipulating member is detachably connected to the outlet port via the connecting end; the connecting end is connected to the plug member, and the gas passage communicates with the axial hole; and the manipulating member drives the plug member to turn between the first position and the second position.

2. The pressure regulating device as claimed in claim 1, further comprising a casing and a cover, wherein the casing is adapted to receive the portable gas tank and has a top opening; the cover is detachably engaged with the casing and closes the top opening, and has a receiving space and a first opening communicating with the receiving space; the pressure stabilizer is disposed in the receiving space of the cover; a location of the outlet port corresponds to the first opening.

3. The pressure regulating device as claimed in claim 2, further comprising a hanging member connected to the cover.

4. The pressure regulating device as claimed in claim 2, wherein the inlet portion has an inlet passage extending in an axial direction of the inlet portion; an end of the inlet passage communicates with the inlet port; a pressure gauge is engaged with the inlet portion of the valve body and communicates with another end of the inlet passage; the cover has a second opening communicating with the receiving space, and the pressure gauge is located in the second opening.

5. The pressure regulating device as claimed in claim 1, wherein at least one positioning member is disposed on the connecting end of the manipulating member; the outlet port of the valve body has a connecting passage; an inner wall of the connecting passage has an annular groove; an end portion of the outlet port has at least one recess communicating with the annular groove; the at least one positioning member enters the annular groove via the at least one recess.

6. The pressure regulating device as claimed in claim 5, wherein the plug member has a first end and a second end opposite to the first end in an axial direction of the plug member; the axial hole has an open side formed at the first end and a close side located between the first end and the second end; the first end has at least one notch; the annular groove surrounds a radial periphery of the at least one notch; when the plug member is located at the first position, the at least one positioning member enters the at least one notch via the at least one recess and is adapted to drive the plug member to turn to the second position along the axial direction of the plug member.

7. The pressure regulating device as claimed in claim 6, wherein the at least one positioning member is arranged in a radial direction of the connecting end and has an outer end protruding out of a radial periphery of the connecting end and an inner end located in the gas passage; when the connecting end is connected to the plug member, the first end of the plug member is located in the gas passage, and the inner end of the at least one positioning member enters the at least one notch, and the outer end of the at least one positioning member enters the annular groove.

8. The pressure regulating device as claimed in claim 7, wherein a sealing member is disposed in the gas passage and has a through hole communicating with the gas passage; when the connecting end is connected to the plug member, the first end of the plug member abuts against the sealing member, and the open side of the axial hole communicates with the through hole.

9. The pressure regulating device as claimed in claim 6, wherein when the at least one positioning member drives the plug member to turn to the second position along the axial direction of the plug member, a groove wall of the annular groove restricts the at least one positioning member in the annular groove.

10. The pressure regulating device as claimed in claim 5, wherein the outlet portion has a receiving hole; the receiving hole has a first section, a second section, and a third section; the first section has the connecting passage; the second section is located between the first section and the third section; a hole wall of the second section is tapered in shape and forms the receiving chamber, and a diameter of the second section gradually decreases in a direction from the first section to the third section; a junction between the third section and the second section has a shoulder portion; the plug member comprises a tapered section and an extending section; an outer peripheral surface of the tapered section matches with the hole wall of the second section; the through hole is located on the tapered section; the extending section is connected to the tapered section and is located at the third section of the receiving hole; the switching assembly comprises an elastic member; an end of the elastic member abuts against the shoulder portion, while another end of the elastic member exerts a force on the extending section in a direction way from the shoulder portion, so that the outer peripheral surface of the tapered section abuts against the hole wall of the second section.

11. The pressure regulating device as claimed in claim 10, wherein the switching assembly comprises a blocking member disposed at the extending section of the plug member; the another end of the elastic member abuts against the blocking member.

12. The pressure regulating device as claimed in claim 11, wherein the elastic member comprises two blocking plates and a spring; the two blocking plates fits around the extending section, and one of the blocking plates abuts against the shoulder portion, while the other blocking plate abuts against the blocking member; the spring fits around the extending section and is located between the two blocking plates.

13. The pressure regulating device as claimed in claim 11, wherein the outlet portion of the valve body has a restricting groove communicating with the third section of the receiving hole; the restricting groove has a first blocking portion and a second blocking portion; the blocking member enters the restricting groove; when the plug member is turned to the first position, the blocking member abuts against the first blocking portion; when the plug member is turned to the second position, the blocking member abuts against the second blocking portion.

* * * * *